United States Patent Office 3,222,364
Patented Dec. 7, 1965

3,222,364
HYDRAZINO-BENZOTHIADIAZINE DIOXIDES
Paul Schmidt, Therwil, and Kurt Eichenberger and Max Wilhelm, Basel, Switzerland, assignors to Ciba Corporation, a corporation of Delaware
No Drawing. Filed Aug. 28, 1961, Ser. No. 134,110
Claims priority, application Switzerland, Oct. 7, 1960, 11,293/60; July 27, 1961, 8,840/61
9 Claims. (Cl. 260—243)

The present invention relates to new 4-hydrazino-2-H-1:2:3-benzothiadiazine-1:1-dioxides which are substituted in higher positions than the 5-position by alkyl, alkoxy, halogen or trifluoromethyl, and of their salts, and a process for preparing same.

Of the aforementioned substituents alkyl stands, for example, for methyl, ethyl, n-propyl or isopropyl, straight or branched butyl, pentyl or hexyl which may be bound in any position, alkoxy, for example, for methoxy, ethoxy, n-propoxy, isopropoxy or butoxy, and halogen, for example, for fluorine, chlorine or bromine.

The invention provides above all compounds of the Formula I

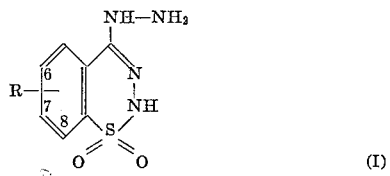

and their salts, in which R represents an alkyl or alkoxy group containing 1 to 4 carbon atoms, or a halogen atom, especially chlorine, or trifluoromethyl, and is in one of the positions 6 to 8, but preferably in position 7.

The new compounds have valuable pharmacological properties; for example they have a diuretic, adrenolytic and fungistatic effect. Above all, however, they show a sustained hypotensive action and can therefore be used as hypotensive agents in therapy. Compared with known hypotensives, such as 1-hydrazino-phthalazine, they show valuable advantages, for example they are less toxic.

Furthermore, the new compounds may be used as intermediates or as solid propellants.

The compounds of the Formula II

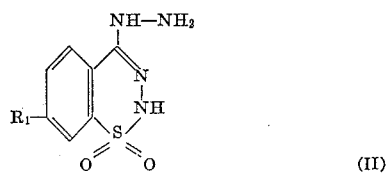

and their salts deserve special mention, in which formula $R_1$ represents chlorine or an alkoxy group containing 1 to 4 carbon atoms, and among these especially 4-hydrazino-7-ethoxy-2-H-1:2:3-benzothiadiazine-1:1-dioxide or 4-hydrazino-7-chloro-2-H-1:2:3-benzothiadiazine-1:1-dioxide and their salts.

The new compounds are obtained by reacting a 2-cyano-benzene-sulfonic acid chloride which is substituted in at least one of the positions 4 to 6 by alkyl, alkoxy, halogen or trifluoromethyl, with hydrazine hydrate, and performing ring closure.

The reaction with hydrazine hydrate is carried out preferably in the presence of a diluent or solvent, for example an alcohol, such as ethanol, if desired at a raised temperature, for example the boiling temperature of the solvent, or in the presence of an inert gas, for example nitrogen. Depending on the method and the starting products used, the reaction may yield the desired products by ring closure without isolating an intermediate. The process may also be carried out in stages, for example, by isolating as intermediate product a 2-sulfonehydrazidobenzoic acid hydrazidine correspondingly substituted in at least one of the positions 3 to 5, for example such of the Formula III

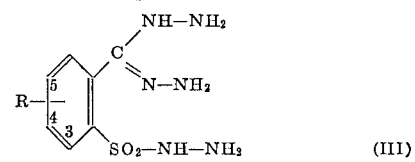

in which R has the meaning given for Formula I, particularly in the form of a salt thereof. Such compounds are easy to cyclise, preferably in an acid medium, or by further heating.

Depending on the reaction conditions used, the new compounds are obtained in the form of the free bases or of their salts, from which latter the free bases can be prepared in the usual manner. From the free bases acid addition salts can be made by reacton with acids, especially such as are capable of forming therapeutically useful salts, for example hydrohalic acids, sulfuric or phosphoric acids, nitric acid or perchloric acid; aliphatic, alicyclic, aromatic or heterocyclic carboxylic or sulfonic acids, such as formic, acetic, propionic, oxalic, succinic, glycolic, lactic, malic, tartaric, citric, ascorbic, maleic, hydroxymaleic, dihydroxymaleic or pyruvic acid; phenylacetic, benzoic, para-aminobenzoic, anthranilic, para-hydroxybenzoic, salicylic or para-amino-salicylic acid; methanesulfonic, ethanesulfonic, hydroxyethanesulfonic or ethylenesulfonic acid; toluenesulfonic, naphthalenesulfonic acids or sulfanilic acid; methionine, tryptophan, lysine or arginine.

The aforementioned starting materials are known, or insofar as they are new, they are made by conventional methods. The aforementioned 2-sulfonehydrazido-benzoic acid hydrazidines obtained as intermediate products, for example those of Formula III, are new and accordingly included within the scope of the present invention. They also display a sustained hypotensive effect with slight toxicity. They may also be used as propellants. Special mention may be made of compounds of Formula IV

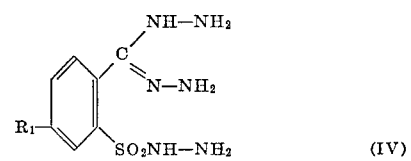

and particularly their salts, in which formula $R_1$ has the meaning given for Formula II, for example 2-sulfonehydrazido-4-ethoxybenzoic acid hydrazidine and its salts.

The aforementioned compounds or their salts can be used as medicaments, for example in the form of pharmaceutical preparations containing the compounds of their salts in admixture or conjunction with a pharmaceutical organic or inorganic solid or liquid excipient suitable for enteral or parenteral administration. Suitable excipients are substances that do not react with the new compounds such, for example, as water, gelatine, lactose, starches, magnesium stearate, talc, vegetable oils, benzyl alcohols, gums, polyalkylene glycols, cholesterol or other known pharmaceutical excipients. The pharmaceutical preparations may be, for example, tablets, dragees or in liquid form as solutions, suspensions or emulsions. They may be sterilized and/or may contain assistants, such as preservatives, stabilizers, wetting or emulsifying agents, salts for regulating the osmotic pressure or buffers. They may also contain other therapeutically valuable substances. The preparations are formulated by the usual methods, preferably they contain 10 to 50 mg. of the active compound per desage unit.

The following examples illustrate the invention:

*Example 1*

11.5 grams of crude 2-cyano-5-methoxybenzenesulfonyl chloride are slowly added to a solution of 12.5 cc. of hydrazine hydrate in 100 cc. of anhydrous ethanol. The mixture is heated for 10 minutes at the boil, then allowed to cool and the crystalline precipitate is suctioned off. Recrystallization from ethanol yields the 4-hydrazino-7-methoxy-2-H-1:2:3-benzothiadiazine-1:1-dioxide of the formula

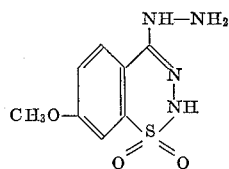

in the form of white crystals which deflagrate at 160° C.

On treatment with ethanolic hydrochloric acid the above product yields its hydrochloride melting at 205° C. with decomposition.

*Example 2*

2.45 grams of 2-cyano-5-ethoxybenzenesulfonyl chloride are slowly added to a solution of 2.5 grams of hydrazine hydrate in 20 cc. of anhydrous ethanol. The mixture is heated for 5 minutes at 60° C., whereupon at first an oil precipitates which subsequently dissolves again. On cooling the solution turns turbid and when it is kept overnight at room temperature a crystalline precipitate forms which is suctioned off. Recrystallization from ethanol yields the 2-sulfonehydrazido-4-ethoxy-benzoic acid hydrazidine hydrochloride in white crystals melting at 145° C. with decomposition.

5 grams of the resulting hydrazidine are treated with 50 cc. of 7 N-ethanolic hydrochloric acid and with 250 cc. of anhydrous ethanol and heated to 60° C. The precipitated hydrazine dihydrochloride is then suctioned off through a hard filter, the filtrate is evaporated to dryness under reduced pressure and the residue is recrystallized from ethanol, to yield the 4-hydrazino-7-ethoxy-2-H-1:2:3-benzothiadiazine-1:1-dioxide hydrochloride of the formula

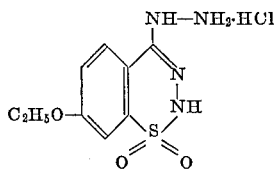

in white crystals melting at 191 to 192° C. with decomposition.

*Example 3*

2.35 grams of 2-cyano-5-chloro-benzenesulfonic acid chloride are slowly added to a solution of 2.5 cc. of hydrazine hydrate in 20 cc. of anhydrous ethanol. The reaction mixture is heated for 5 minutes at the boil, then allowed to cool and the crystalline precipitate is suctioned off. Recrystallization from ethanol yields 4-hydrazino - 7 - chloro - 2 - H - 1:2:3 - benzo - thiadiazine-1:1 - dioxide of the formula

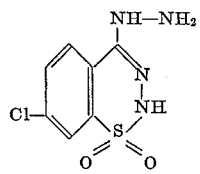

in the form of white crystals which deflagrate at 159° C.

On treatment with ethanolic hydrochloric acid the above product yields its hydrochloride melting at 204 to 206° C. with decomposition.

*Example 4*

Tablets containing 25 mg. of active principle can be prepared as follows.

Ingredients for 1000 tablets:                                G.
  4 - hydrazino-7-ethoxy-2-H-1:2:3-benzothiadia-
     zine-1:1-dioxide hydrochloride _____ 25.0
  Lactose _____ 60.0
  Wheat starch _____ 40.0
  Colloidal silicic acid with hydrolyzed starch ___ 6.0
  Arrowroot _____ 2.0
  Stearic acid _____ 2.0
  Magnesium stearate _____ 1.0
  Talc _____ 4.0
                                                                    140.0

The lactose is mixed with two thirds of the wheat starch, and with the colloidal silicic acid with hydrolyzed starch, and the talc. On the water bath, one third of the wheat starch is converted into mucilage with which the powder mixture is worked up into an excipient granulate. To the latter are added the afore-mentioned active substance, the magnesium stearate, the stearic acid, and the arrowroot, and the mixture compressed into tablets weighing 140 mg. each and having a diameter of 7 mm.

What is claimed is:

1. A member of the group consisting of compounds of formula

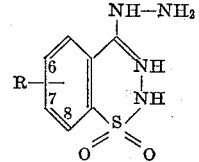

and their acid addition salts, in which R stands for a member of the group consisting of alkoxy containing 1 to 4 carbon atoms, halogen and trifluoromethyl, which substituent R is in one of the positions 6 to 8.

2. 4 - hydrazino - 7-methoxy-2-H-1:2:3-benzothiadiazine-1:1-dioxide.

3. 4 - hydrazino-7-ethoxy-2-H-1:2:3-benzothiadiazine-1:1-dioxide.

4. 4 - hydrazino-7-chloro-2-H-1:2:3-benzothiadiazine-1:1-dioxide.

5. Compounds of the formula

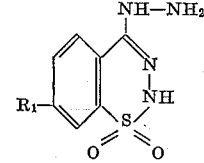

in which $R_1$ stands for alkoxy having from 1 to 4 carbon atoms.

6. An acid addition salt of a compound of claim 5.
7. An acid addition salt of a compound of claim 2.
8. An acid addition salt of a compound of claim 3.
9. An acid addition salt of a compound of claim 4.

References Cited by the Examiner

UNITED STATES PATENTS

| | | | |
|---|---|---|---|
| 2,853,519 | 9/1958 | Cook et al. | 260—556 |
| 2,860,165 | 11/1958 | Schraufstatter | 260—556 |
| 2,993,829 | 7/1961 | Lemin | 260—556 |
| 3,009,911 | 11/1961 | McManus | 260—243 |
| 3,025,292 | 3/1962 | Jones et al. | 260—243 |

OTHER REFERENCES

Schmidt et al.: Helvetica Chimica Acta, volume 45, 996–999 (1962).

Schrader: Jour. Chem. Society (London), pages 197–198 (1918).

NICHOLAS S. RIZZO, *Primary Examiner.*

WALTER A. MODANCE, *Examiner.*

UNITED STATES PATENT OFFICE
CERTIFICATE OF CORRECTION

Patent No. 3,222,364                           December 7, 1965

Paul Schmidt et al.

It is hereby certified that error appears in the above numbered patent requiring correction and that the said Letters Patent should read as corrected below.

Column 4, lines 28 to 34, the formula should appear as shown below instead of as in the patent:

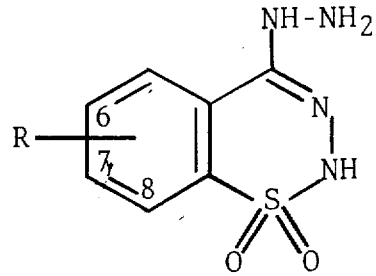

Signed and sealed this 18th day of October 1966.

(SEAL)
Attest:

ERNEST W. SWIDER                        EDWARD J. BRENNER
Attesting Officer                    Commissioner of Patents